United States Patent [19]

Hughes

[11] Patent Number: 4,816,672
[45] Date of Patent: Mar. 28, 1989

[54] REMOTE METERING SYSTEM USING REFLECTED LIGHT

[75] Inventor: Christopher J. Hughes, Woodley, England

[73] Assignee: Thorn EMI plc, London, England

[21] Appl. No.: 64,061

[22] Filed: Jun. 19, 1987

[30] Foreign Application Priority Data

Jun. 21, 1986 [GB] United Kingdom ............... 8615203

[51] Int. Cl.$^4$ .............................................. G01D 5/34
[52] U.S. Cl. ............................... 250/231 SE; 250/226
[58] Field of Search ............ 250/231 SE, 227, 231 R, 250/226

[56] References Cited

U.S. PATENT DOCUMENTS

| | | | |
|---|---|---|---|
| 4,334,152 | 6/1982 | Dakin et al. | 250/226 |
| 4,517,456 | 5/1985 | Halsall et al. | 250/226 |
| 4,543,961 | 10/1985 | Brown | 250/226 |
| 4,689,485 | 8/1987 | McMurtry | 250/231 SE |

*Primary Examiner*—David C. Nelms
*Assistant Examiner*—Jessica L. Ruoff
*Attorney, Agent, or Firm*—Fleit, Jacobson, Cohn & Price

[57] ABSTRACT

A system for the remote reading of a gas meter includes an interface unit within a domestic residence but situated such that an input/output terminal for the interface unit is accessable from the exterior of the residence, and a hand-held meter reading unit for connection to the terminal in order to read and record the value of the gas consumption indicated by the meter. The meter reading unit has two LED sources, whose outputs are combined a Y-coupler, for passage into the interface unit when an optical fibre is connected thereto. At a multiplexer, the combined beam is dispersed according to wavelength and separately passes along a fibre array to respective roller digits of the tumbler for reflection or not according to the displayed reading. Reflected light passes back through the system, is divided at a Y-coupler and passes to a de-multiplexer such that the light returning in respect of the roller digits can be measured and displayed at a light detector and liquid crystal display.

14 Claims, 1 Drawing Sheet

REMOTE METERING SYSTEM USING REFLECTED LIGHT

The present invention relates to a remote metering system.

The present invention provides a remote-metering system comprising: a light source; an optical fibre for connection with the light source thereby to direct light therefrom towards means to separate the light into a number of different-wavelength portions of light; an array of optical fibres for connection to the output of the separation means to enable each said light portion to be fed into a separate optical fibre of said array; meter means having at least one moveable member with two or more sets of markings, to indicate the consumption of a quantity; the end of each fibre in the array remote from the separation means being located in the vicinity of a set of markings to cause light, output from the fibre end and reflected at the moveable member, to return into the fibre; means to direct reflected light, from all the fibres of the array, into the optical fibre for connection with the light source; and means for determining whether a reflected light output exists for each set of markings.

Preferably, the light source is detachably connectable to the separation means. Also preferably, the determining means is detachably connectable to the direction means. Advantageously, the light source and the determining means are situated in a unit which is detachably connectable to other components of the system.

Preferably, one device can achieve the separation and direction functions as specified, and thereby constitutes the separation means and the direction means.

The present invention also provides a meter interface unit comprising the separation means and an array of the system as defined herein.

According to this aspect, the present invention may provide a meter interface unit for a remote-metering system, the unit comprising means to separate light from a light source into a number of different-wavelength portions of light; an array of optical fibres arranged with the output of the separation means to enable each said light portion to be fed into a separate optical fibre of said array, the end of each fibre in the array remote from the separation means for location in the vicinity of a set of markings to cause light, output from the fibre end and reflected at the moveable member, to return into the fibre.

The present invention also provides a meter reading unit comprising the light source and determining means of the system as defined herein.

According to this aspect, the present invention may provide a meter reading unit for a remote-metering system, the unit comprising a light source; an optical fibre for connection with the light source thereby to direct light therefrom towards means to separate the light into a number of different-wavelength portions of light; and means for determining whether a reflected light output exists for each set of markings of a meter.

In order that the invention may more readily be understood, a description is now given, by way of example only, reference being made to the accompanying drawings, in which.

Figure 1:
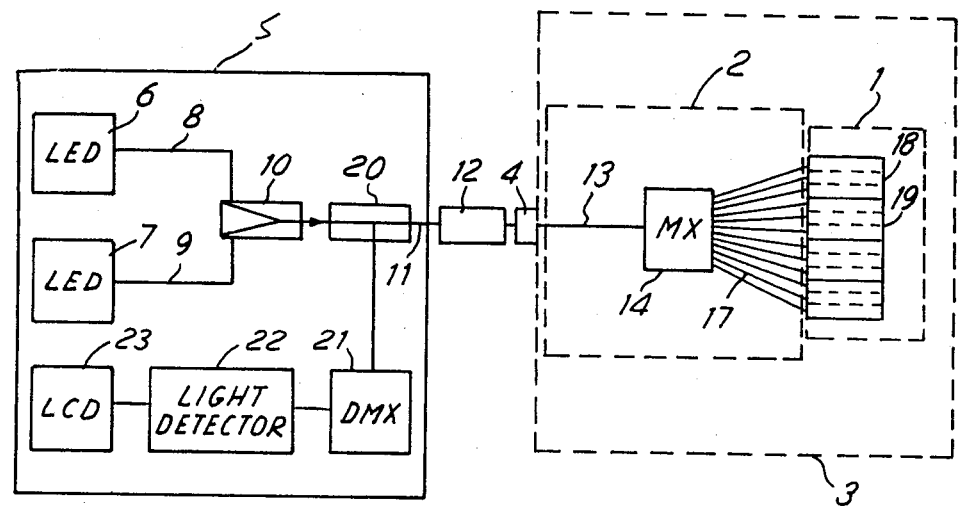
FIG. 1 is a block diagram of a remote metering system.

FIG. 1 shows a gas meter 1 having a remote-metering interface unit 2 within a domestic residence 3 but situated such that an input/output terminal 4 for unit 2 is accessible from the exterior of the residence. There is also shown in this Figure a hand-held meter reading unit 5 for connection to terminal 4 in order to read and record the value of the gas consumption indicated by meter 1.

More specifically, unit 5 has two LED sources 6 and 7, one with a peak emission at 820 nm and the other at 860 nm; each is butt-coupled to an optical fibre 8,9 respectively, which are joined at a Y-coupler 10 to combine the two light outputs, thereby giving a light beam with a 3 dB bandwidth of approximately 100 nm. The power consumption of the LEDs 6,7 and their associated drivers is less than 3 watts.

Figure 2:
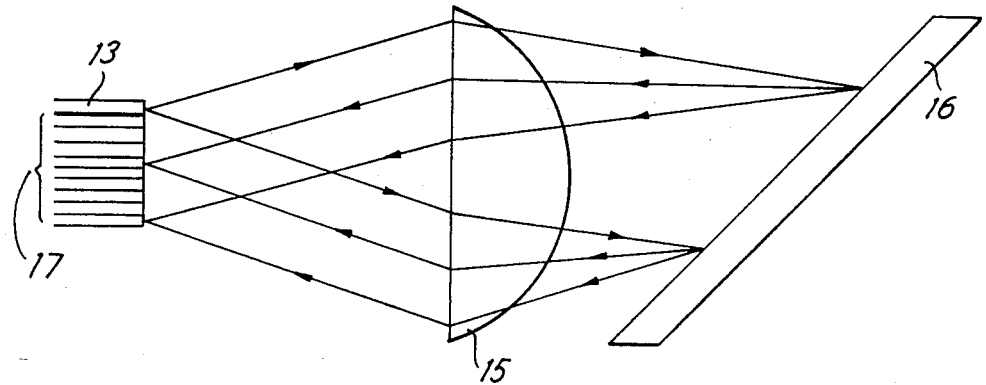
FIG. 2 is a schematic view of part of the system of FIG. 1.

When the length 11 of optical fibre, which extends from coupler 10, is connected via a connection unit 12 to terminal 4 (and hence optical fibre 13) of unit 2, then the combined light beam output from coupler 10 passes into unit 2. The beam is received at multiplexer 14, where it is collimated by a lens 15 (see FIG. 2) and is incident on a grating 16 where it is reflected and dispersed. Each wavelength of the incident beam is reflected at an angle depending on groove density and angular setting of the grating. The reflected light is then refocussed by the lens 15; however, the spread of wavelengths which now exists results in the beam being refocussed over a wide area of the fibre array 17 (not merely that region of the input fibre 13). This is because each wavelength, being incident onto lens 15 at an angle different to all other wavelengths in the spectrum is focussed to a different position on the array 17. Consequently each fibre in the array 17 only receives a small portion of the total light spectrum, the amount depending on the size of the fibre core, the focal length of the lens 15 and the dispersion of the grating 16.

The optical fibers used in the system are chosen to match commercially available Y-couplers, and to give maximum coupling to LEDs while keeping the multiplexer array width to a minimum. Thus for example the fibre may be wholly silica, step index with a numerical aperture of 0.3, a core diameter of 100 $\mu$m, cladding diameter of 140 $\mu$m and an outer polymer buffer of 250 $\mu$m diameter.

The gas meter provides a visual display of five decimal digits to indicate the quantity of gas consumed, the display comprising a tumbler 18 of five rollers 19 each with the numbers 0 to 9 marked thereon. Each roller 19 also has a space beside each number, each space providing a four-digit binary representation of the appropriate number arranged in a Grey code format, whereby a "1" is indicated by a section covered in retroreflective material and an "0" by a section with a non-reflective surface. Use of retroreflective material can eliminate the need to accurately align and position the fibres to the rollers.

A fibre from array 17 is assigned to each binary digit of roller 19 so that the array 17 must incorporate twenty fibres in order to service tumbler 18. Each fibre of array 17 guides its portion of the total spectrum to the relevent position on the tumbler 18 where the light is either reflected (bit=1) or not (bit=0). Any reflected light is recaptured by that fibre and reguided back to the multiplexer 14, which also works in reverse. Thus each fibre of array 17 now acts as an input fibre for multiplexer 14 guiding a small portion of the total spectrum. The fibre 13 now becomes the output fibre for the multiplexer and the grating recombines the various portions of the spectrum which are then retransmitted down fibre 13 to unit 5.

As the returning light passes along fibre 11 in unit 5, a portion is diverted by a Y-coupler 20 and directed to a de-multiplexer 21 which operates in a similar way to multiplexer 14 in that the input range of wavelengths is dispersed, each wavelength being focussed to a different position in a line spectrum. The output of de-multiplexer 21 is caused to fall upon a light detector array 22, each element of which determines whether there is any light output at the particular wavelength falling upon it. Thus by determining whether each element of detector 22 notes the existence of a light signal corresponding to passage of a wavelength attributed to a roller digit, and recording it, the meter recording can be obtained at unit 5 and displayed on a liquid crystal display 23. Alternatively, light detector array 22 might be replaced with a fibre optic array, each optical fibre being directed to a separate light detector; or light detector array 22 might be replaced with a single light detector element which is mechanically scanned along the line spectrum; or light detector array 22 might be replaced by a fibre optic array of suitable shape such that a single light detector may be mechanically scanned over the outputs of the fibres. In a variant, the light detector 22 is replaced by a single light detector and an array of optical modulators or switches to alter the wave length, or limited group of wavelengths, falling on the light detector.

A CCD array may be placed at the focal plane of the de-multiplexer to detect the optical signals for subsequent recordal and processing at a microprocessor unit to compensate for the spectral distribution of the source and variations in source intensity, and losses due to connector 4. Such variations may be compensated by including two reference fibres in the interface unit 2. One such fibre is directed to an area in unit 2 which is reflective (constituted by retroreflective material) and the corresponding signal generated in the light detector array 22 is designated a reference for binary values of "1". The second such fibre is directed to an area in unit 2 which is non-reflective and the corresponding signal generated in the light detector array 22 is designated a reference for binary values of "0". Scaling of the signals generated in the light detector array 22, corresponding to the other fibres in the array 17, with these reference signals, may be used in conjunction with the known spectral distribution of the combined outputs of the LEDs 6 and 7 in order to provide the required compensation.

Interfacing of the fibre array 17 with the multiplexer 14 is achieved in similar fashion to that with rollers 19. Thus, for the interface with the multiplexer, 24 slots (each 120 μm wide and on 140 μm centres) are machined in the perspex base to act as guides for the fibres. One of these slots is maintained empty to separate the input fibre from the rest to prevent or inhibit optical crosstalk. A perspex cover, clamped to the base but spaced from it by 100 μm, is used to keep the fibres in position until they can be permanantly fixed using a u.v. curing adhesive. For the interface with the rollers, the arrrangement aligns each of the fibres to its correct position opposite the coed spaced on the rollers and is produced by machining 20 slots in groups of 4, each slot being 140 μm. wide on 1.15 mm centres within each group. The groups are on 13.6 mm centres. A perspex cover clamps the fibres in position.

Another form of the present invention may provide a remote metering system which interfaces with an electrical-mains-wiring signalling system. In such a situation the remote metering system has a meter interface unit essentially the same as unit 2 of FIG. 1 and located by the meter, but that it now connects with a signalling interface unit located within the residence and of similar components to the unit 5 of FIG. 1 except the detector equivalent to detector 22 now feeds its output to a modem which inserts an appropriate signal into the electrical mains wiring for passage to a central control unit of the signalling system (which may be within the residence or not). The meter readings may be used to control functions or operations (e.g. heating) of the residence, or to prepare invoices for consumption charges, or both.

Another form of the present invention may use a multiplexer provided with a concave mirror to collimate the light rather than lens 15.

Another form of the invention may use a multiplexer fabricated by injection moulding thermosetting polymers incorporating a grating, lenses or mirrors, and a fibre array.

Another form of the present invention may use a modified form of Grey Code, whereby only one digit of the binary encoded number changes between neighbouring numbers and such that the code is continuous through the numbers 0 to 9 and correct for the change 9 to 0. The numbers on the rollers are encoded such that the number displayed by the tumbler 18 may still be encoded and decoded even though some of the rollers may be in the process of changing the displayed numeral.

Another form of the invention may use a reflector around the roller with a reflection efficiency that continuously varies around the circumference of the roller so that the amount of light reflected back into the fibre depends on the rotational position of the roller. In this way an analog rather than digital signal representing the position of the roller is obtained. Any combination of digital and analog coding means may be used to eliminate ambiguous readings when the rollers are in the process of changing the displayed numeral or to reduce the number of fibres required to read each roller and thereby reduce the complexity of the multiplexer.

Another form of the present invention may provide means to effect reading of a meter identification number in a likewise manner to the reading of the roller values. The meter identification number comprises an appropriate pattern of reflective areas (constituted by retroreflective material) and non-reflective areas whose sequence provides a binary representation of the relevant identification number. Reading of a meter identification number is particularly important when the present invention is utilised in a mains signalling system.

For a number of reasons, the present invention provides an intrinsically safe technique for the remote reading of a meter. It provides an optical interface with the meter rather than an electrical or electromechanical interface; also it requires only a low-energy source, and moreover the light source can be positioned in a safe and convenient distance from the meter. Furthermore the light source need be energised only when a reading is being made.

The present invention is applicable to the reading of any appropriate type of meter, for example an electricity meter, a water meter, a meter in a petrol pump or gasoline dispenser.

I claim:

1. A remote-metering system comprising: a light source; an optical fibre for connection with the light source thereby to direct light therefrom towards means to separate the light into a number of different-wavelength portions of light; an array of optical fibres for connection to the output of the separation means to enable each said light portion to be fed into a separate optical fibre of said array; meter means having at least one moveable member with two or more sets of markings, to indicate the consumption of a quantity; the end of each fibre in the array remote from the separation means being located in the vicinity of a set of markings to cause light, output from the fibre end and reflected at the moveable member, to return into the fibre; means to direct reflected light, from all the fibres of the array, into the optical fibre for connection with the light source; and means for determining whether a reflected light output exists for each set of markings.

2. A system according to claim 1, wherein the light source is detachably connectable to the separation means.

3. A system according to claim 1, wherein the determining means is detachably connectable to the direction means.

4. A system according to claims 1, wherein the light source and the determining means are situated in a unit which is detachably connectable to other components of the system.

5. A system according to claim 1, wherein one device constitutes the separation means and the direction means.

6. A system according to claim 1, wherein the meter incorporates retroreflective material in the provision of sets of markings.

7. A system according to claim 1, comprising means to compensate for changes in light source intensity and spectral distribution.

8. A meter-interface unit for a remote-metering system, the unit comprising means to separate light from a light source into a number of different-wavelength portions of light; an array of optical fibres arranged with the output of the separation means to enable each said light portion to be fed into a separate optical fibre of said array, the end of each fibre in the array remote from the separation means for location in the vicinity of a set of markings to cause light, output from the fibre end and reflected at the moveable member, to return into the fibre.

9. A meter reading unit for a remote-metering system, the unit comprising a light source; an optical fibre for connection with the light source thereby to direct light therefrom towards means to separate the light into a number of different-wavelength portions of light; and means for determining whether a reflected light output exists for each set of markings of a meter.

10. A remote metering system comprising:
a light source; means for separating the light from the light source into a number of different-wavelength portions of light; a plurality of light transmissive means each arranged to receive light of a respective one of said portions; a plurality of markings indicative of a quantity metered; means causing light portions transmitted by said light transmissive means to be incident on a respective one of said markings and light reflected at said markings to be returned into the respective light transmissive means; and means receiving said reflected light for identifying each marking at which light was reflected to determine the metered quantity.

11. A remote metering system comprising:
a light source; means for separating the light from the light source into a number of different wavelength portions of light; a plurality of markings indicative of a quantity to be metered; a plurality of light transmissive means each arranged to receive light of a respective one of said portions and transmit it to a respective one of said markings; means for receiving light reflected at said portions and analysing it to determine the metered quantity; and means for transmitting the reflected light from the respective markings to the receiving and analysing means.

12. A remote metering system according to claim 11 in which the means for transmitting the reflected light is the said plurality of light transmissive means.

13. An arrangement for reading a plurality of indicia representative of information, the arrangement comprising: a light source; means for separating the light from said source into components of different wavelengths; light transmissive means for receiving said components and transmitting each component to a respective one of said indicia; means for receiving light reflected at said indicia and for analysing it to determine said information; and light transmissive means for transmittng the reflected light from the indicia to the receiving and analysing means.

14. An a arrangement according to claim 13 in which the means for receiving and analysing are separable from the means for separating the light into components and the light transmissive means.

* * * * *